(12) United States Patent
Griffith et al.

(10) Patent No.: US 9,176,834 B2
(45) Date of Patent: *Nov. 3, 2015

(54) TOLERATING FAILURES USING CONCURRENCY IN A CLUSTER

(71) Applicant: GlobalFoundries U.S. 2 LLC, Hopewell Junction, NY (US)

(72) Inventors: Douglas Griffith, Austin, TX (US); Angela Astrid Jaehde, Austin, TX (US); Matthew Ryan Ochs, Austin, TX (US)

(73) Assignee: GlobalFoundries U.S. 2 LLC, Hopewell Junction, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/031,767

(22) Filed: Sep. 19, 2013

(65) Prior Publication Data

US 2015/0019901 A1 Jan. 15, 2015

Related U.S. Application Data

(63) Continuation of application No. 13/939,928, filed on Jul. 11, 2013.

(51) Int. Cl.
*G06F 11/00* (2006.01)
*G06F 11/20* (2006.01)

(52) U.S. Cl.
CPC ........ *G06F 11/2028* (2013.01); *G06F 11/2002* (2013.01); *G06F 11/2038* (2013.01); *G06F 11/2048* (2013.01)

(58) Field of Classification Search
None
See application file for complete search history.

(56) References Cited

U.S. PATENT DOCUMENTS

| | | | |
|---|---|---|---|
| 7,689,862 B1* | 3/2010 | Bharthulwar et al. | 714/13 |
| 2004/0034807 A1 | 2/2004 | Rostowfske | |
| 2009/0010154 A1 | 1/2009 | Martinotti et al. | |
| 2009/0086623 A1* | 4/2009 | Gao et al. | 370/221 |
| 2010/0260041 A1 | 10/2010 | Yan et al. | |
| 2011/0047413 A1* | 2/2011 | McGill et al. | 714/15 |
| 2011/0283149 A1* | 11/2011 | Richmond | 714/39 |
| 2012/0060053 A1* | 3/2012 | White et al. | 714/6.3 |

(Continued)

FOREIGN PATENT DOCUMENTS

CN 102025758 A 4/2011
WO WO 2007146708 A2 * 12/2007

OTHER PUBLICATIONS

International Searching Authority, International search report and written openion of the international searching authority or the declaration, International application No. PCT/CN2014/081842, Oct. 10, 2014.

*Primary Examiner* — Yolanda L Wilson

(57) ABSTRACT

A method is provided in the illustrative embodiments. A failure is detected in a first computing node serving an application in a cluster. A subset of actions is selected from a set of actions, the set of actions configured to transfer the serving of the application from the first computing node to a second computing node in the cluster. A waiting period is set for the first computing node. The first computing node is allowed to continue serving the application during the waiting period. During the waiting period, concurrently with the first computing node serving the application, the subset of actions is performed at the second computing node. Responsive to receiving a signal of activity from the first computing node during the waiting period, the concurrent operation of the second computing node is aborted.

11 Claims, 11 Drawing Sheets

(56) References Cited

U.S. PATENT DOCUMENTS

2012/0124431 A1* 5/2012 Bauer et al. .................... 714/55
2012/0128135 A1* 5/2012 Sun ........................... 379/27.01
2012/0259819 A1 10/2012 Patwardhan et al.

* cited by examiner

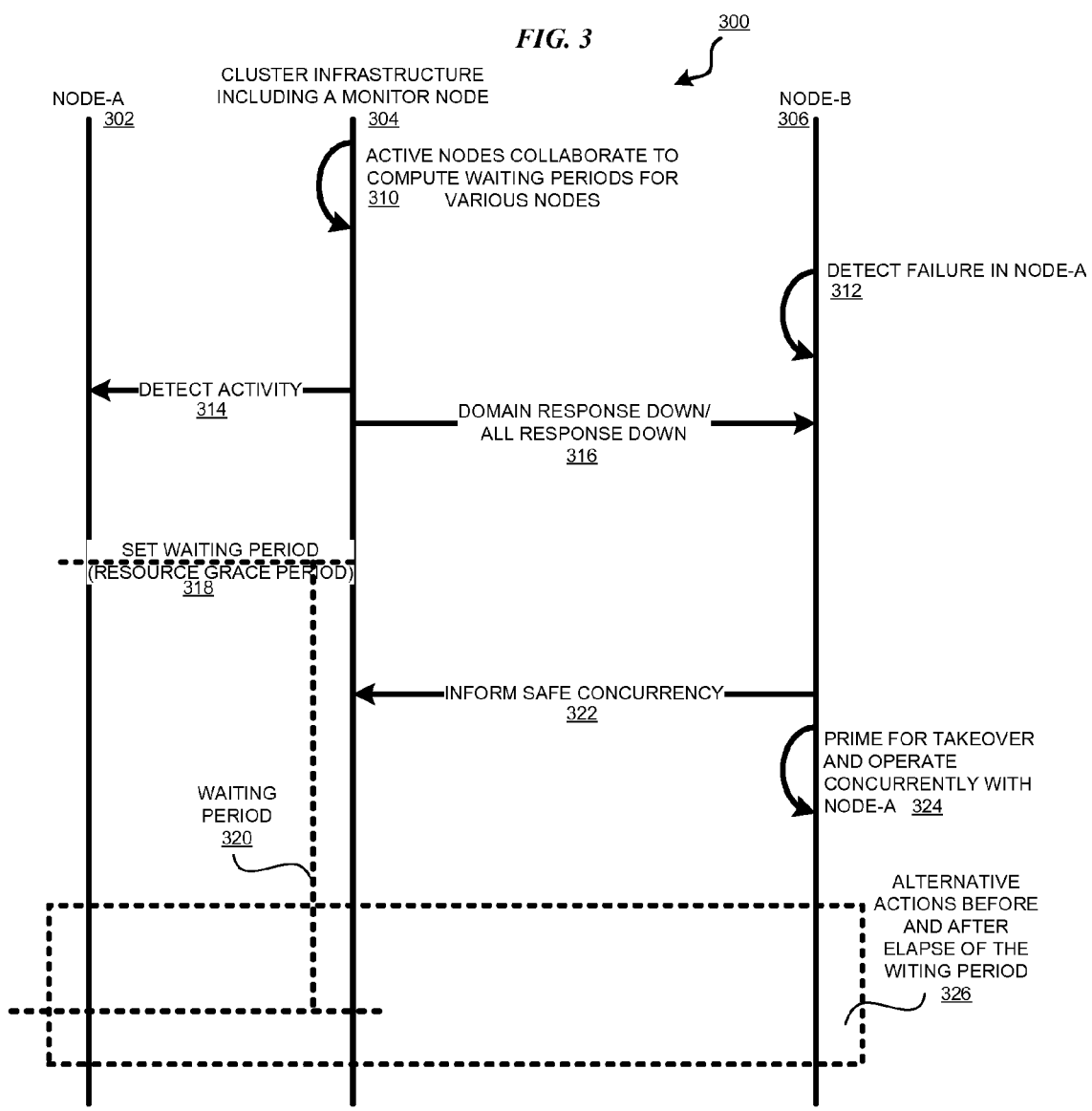

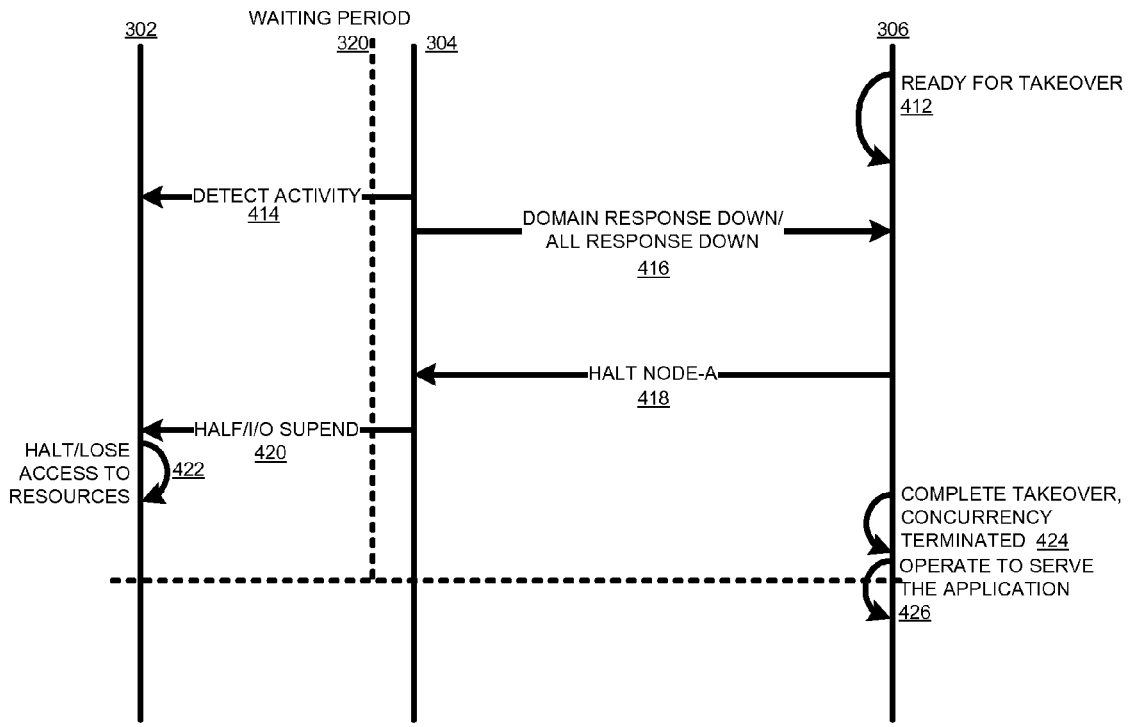
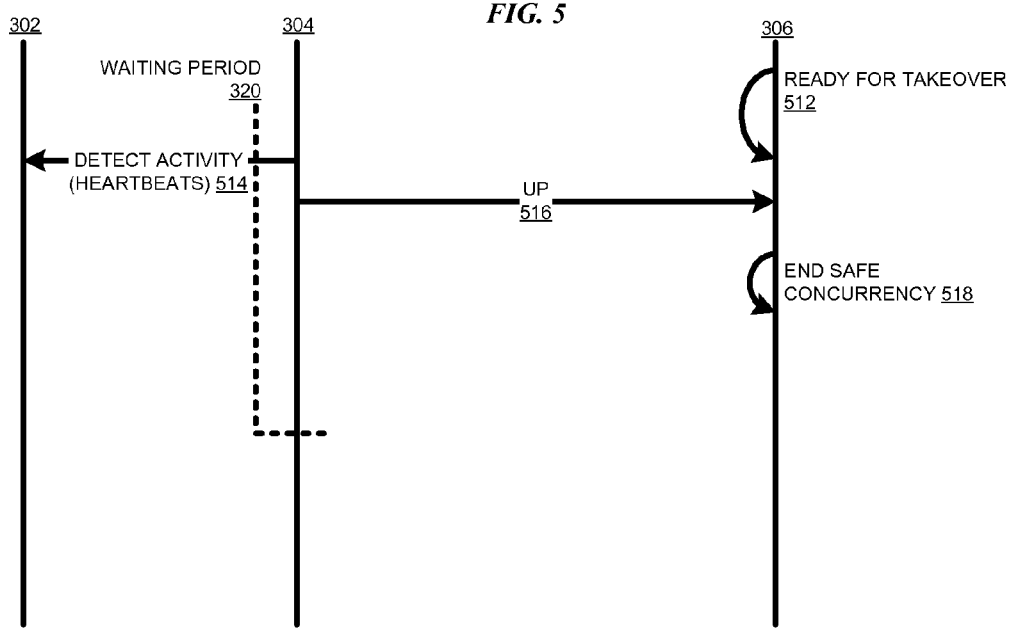

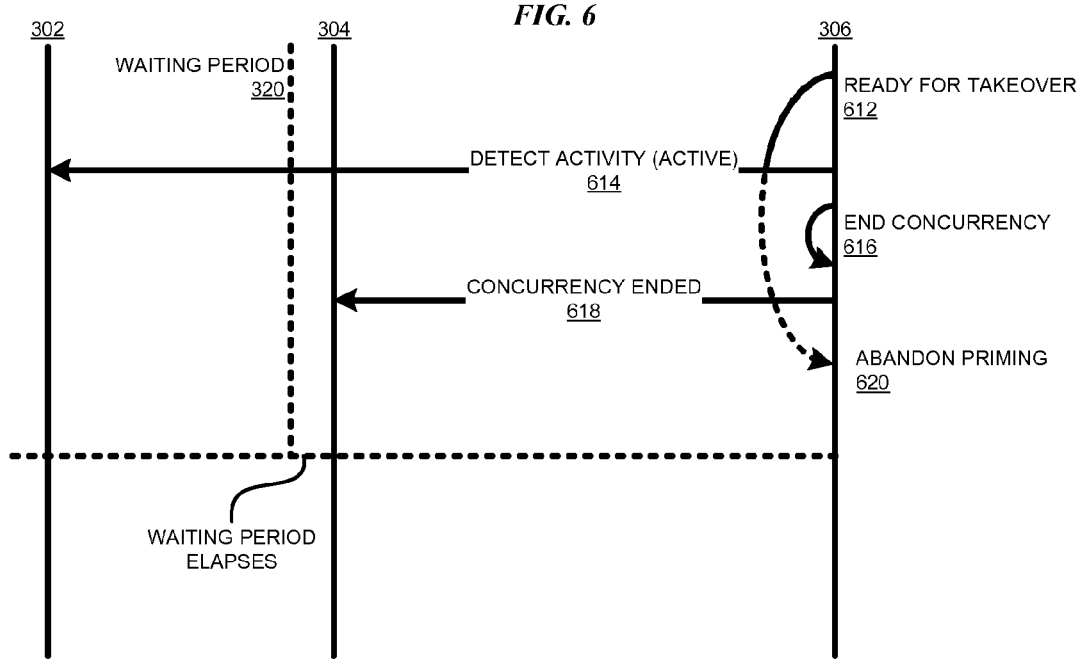
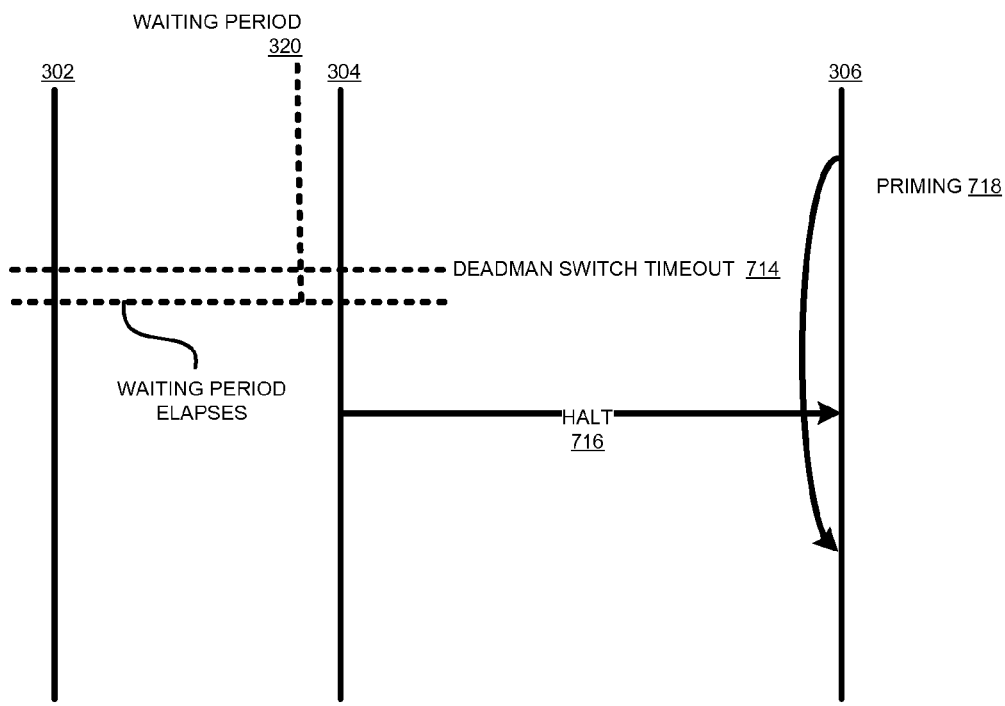

TOLERATING FAILURES USING CONCURRENCY IN A CLUSTER

RELATED APPLICATIONS

The present application is a continuation nonprovisional application claiming the priority of the filing date of the co-pending and commonly assigned U.S. patent application Ser. No. 13/939,928 entitled "TOLERATING FAILURES USING CONCURRENCY IN A CLUSTER," filed on Jul. 11, 2013.

BACKGROUND

1. Technical Field

The present invention relates generally to a method for managing a data processing environment. More particularly, the present invention relates to a method for tolerating failures using concurrency in a cluster.

2. Description of the Related Art

Data processing systems can be divided into logical partitions (LPARs). Such data processing systems are also known as logically partitioned data processing systems. A logically partition is also known simply as a "partition." Each partition operates as a separate data processing system independent of the other partitions. Generally, a partition management firmware component connects the various partitions and provides the network connectivity among them. A Hypervisor is an example of such partition management firmware.

Workload partition is a technology that allows separating users and applications by employing software techniques instead of forming separate hardware partitions. In other words, a data processing system can be so configured as to allow one or more virtual partitions to operate within the data processing system's operating system. Such a virtual partition is called a workload partition, or WPAR.

A high availability (HA) system is a data processing system configured to ensure a threshold level of operational continuity during a given period. Availability refers to the ability of the users and applications to access the data processing system, whether to submit new work, update or alter existing work, or collect the results of previous work. If a user or application cannot access the system, the system is said to be unavailable. Generally, the term downtime is used to refer to periods when a system is unavailable. HA systems are often employed in business organizations to deliver business critical applications and services.

An HA system can be configured using a one or more physical or logical data processing systems. For example, one HA system may include several standalone physical data processing systems configured to operate in unison. As another example, several logical data processing systems, such as LPARs, may be configured to operate together to form a HA system.

As another example, a combination of one or more WPARs, LPARs, and physical data processing systems may also form a part of a HA system. Such a combination is called a cluster. HA systems or clusters therein may further include other components, systems, or devices. For example, a cluster may include an array of data storage devices, such as a storage area network (SAN). As another example, a HA system or a cluster therein may also include a networking device, such as a switch.

SUMMARY

The illustrative embodiments provide a method for tolerating failures using concurrency in a cluster. An embodiment detects a failure in a first computing node, the first computing node serving an application in a cluster of computing nodes. The embodiment selects a subset of actions from a set of actions, the set of actions configured to transfer the serving of the application from the first computing node to a second computing node in the cluster. The embodiment sets a waiting period for the first computing node. The embodiment allows the first computing node to continue serving the application in the cluster during the waiting period. The embodiment performs during the waiting period, concurrently with the first computing node serving the application, the subset of actions at the second computing node. The embodiment aborts, responsive to receiving a signal of activity from the first computing node during the waiting period, the concurrent operation of the second computing node in the cluster.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a timing diagram of a clustered database environment that can be modified by using an illustrative embodiment;

FIG. 4 depicts a timing diagram of operations within the resource grace period in accordance with an illustrative embodiment;

FIG. 5 depicts a timing diagram of operations within the resource grace period in accordance with an illustrative embodiment;

FIG. 6 depicts a timing diagram of operations within the resource grace period in accordance with an illustrative embodiment;

FIG. 7 depicts a timing diagram of operations within the resource grace period in accordance with an illustrative embodiment;

DETAILED DESCRIPTION

Figure 1:
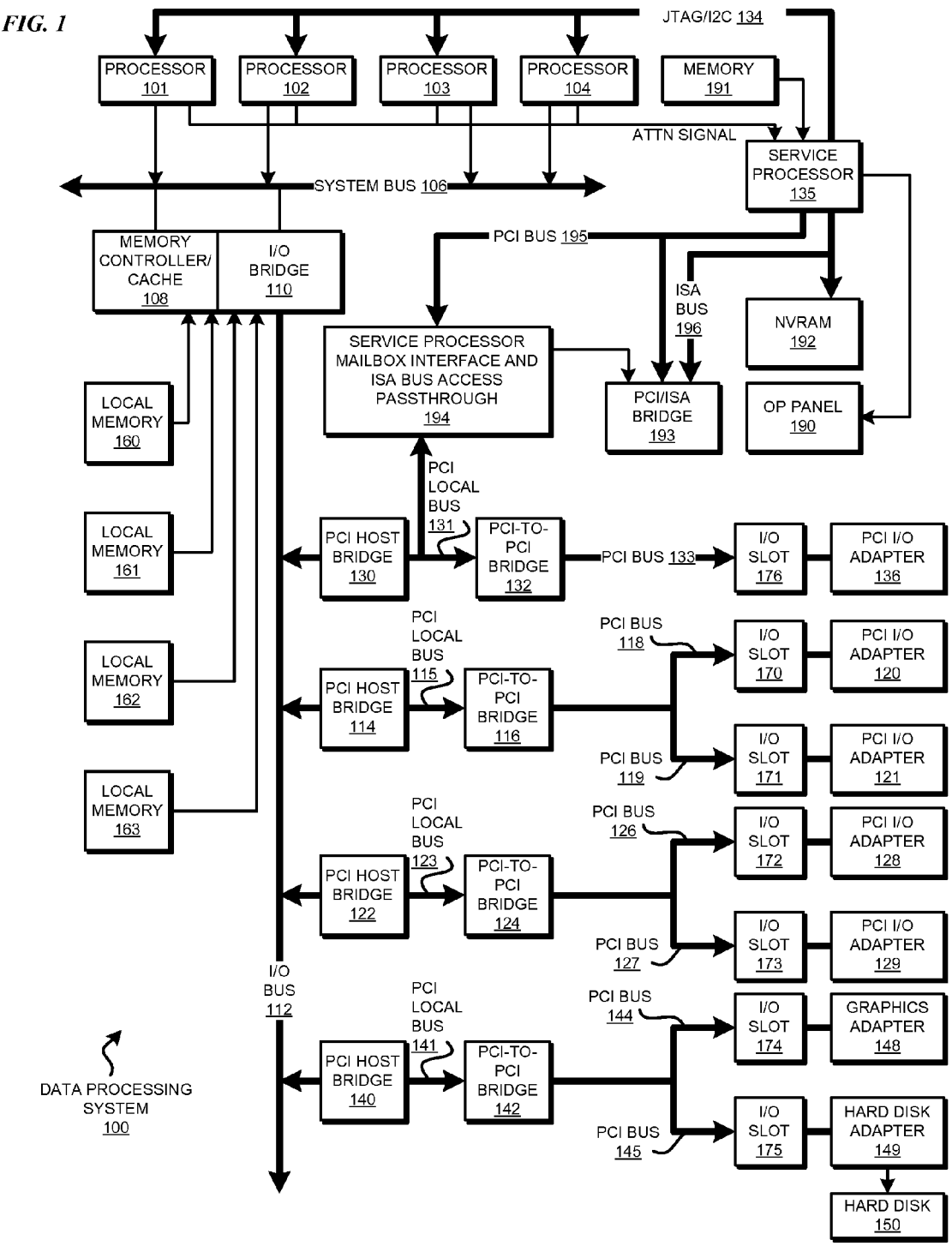
FIG. 1 depicts a block diagram of a network of data processing systems in which illustrative embodiments may be implemented.

In a clustered environment, a disaster recovery solution is configured to trigger upon detection of a failure in the primary computing node that is providing a service, such as serving an application. The recovery solution initiates a takeover of the service by moving the responsibilities of providing the service to another node—the takeover node.

The illustrative embodiments recognize that recovery in a clustered environment is resource-intensive, and a computationally expensive operation. The illustrative embodiments further recognize that not all failures detected in a primary node are fatal or non-recoverable failures. Some failures presently detected can be regarded as false failures. A false failure (or a falsely detected failure) is a condition that appears to indicate that the associated computing node is not active where the node is actually active but not performing within certain parameters.

For example, heartbeat is a periodic messaging system amongst clustered computing nodes. A heartbeat sent from a node indicates to other nodes in the cluster that the sending (heartbeating) node is alive and active. If a primary node fails to send a heartbeat within a designated time-window, the heartbeat timeout grace period, a takeover node may conclude that the primary node has become inactive and begin a recovery operation. The primary node, however, may be alive, but a condition in the node may have prevented the thread that sends the heartbeat from getting the processor time, or a condition in the network may have delayed the heartbeat packet from reaching the takeover node.

The example of heartbeat failure is not the only false failure. Many other false failures can similarly occur in a clustered database environment. The illustrative embodiments recognize that initiating a recovery operation during false failures is undesirable.

Furthermore, presently available recovery methods depend on terminating all operations of the failing node, and taking over of all resources of the failing node by the takeover node. In other words, presently, a node is either "up" or "down" in a cluster. Correspondingly, a node is either operating or halted in a cluster, with no in-between possibilities for a more graceful exit or re-initiation of the failing node's processes.

The illustrative embodiments used to describe the invention generally address and solve the above-described problems and other problems related to recovering from failures in clustered data processing environments. The illustrative embodiments provide a method for tolerating failures using concurrency in a cluster.

Presently available disaster recovery solutions do not distinguish between failures from which a node cannot recover within the parameters of high-availability, and failures from which recovery within the high-availability parameters is a possibility. A failing node only has one grace period, e.g., the time window to transmit a heartbeat, after which the failing node is declared "down" in the cluster and takeover actions begin at a takeover node. Disaster recovery, whether due to actual fatal failures or falsely detected failures, causes the takeover node to perform a substantial amount of preparatory work upon expiration of the grace period. Taking over the service becomes mandatory. The performance of such preparatory work is referred to as priming within this disclosure.

The illustrative embodiments enhance the cluster infrastructure of a cluster such that the cluster becomes more tolerant of temporary outages, such as due to false failures, as compared to the level of tolerance in the presently operating clusters. The illustrative embodiments allow a node in distress—a failing node—an opportunity to recover whilst also proactively priming one or more other nodes for a potential takeover of the failing node's workload. The illustrative embodiments describe three new concepts designed to work together within a cluster: a plurality of grace periods, one or more monitoring nodes, and set of new cluster-wide states or commands.

In one embodiment, a new communication-loss grace period—the responsiveness grace period—is introduced that is longer than existing hard timeouts that are presently implemented as a deadman switch to terminate the failing node. Once a node has entered the responsiveness grace period, one or more nodes in the cluster begin priming in preparation for a takeover.

Transaction log replay in a clustered database is one example of priming. Transaction log replay includes reconstructing the tables from the transaction log on disk. Depending on the amount of uncommitted transaction log entries, log replay might take anywhere from minutes to hours after ungraceful termination of a database. Log replay according to present techniques is guaranteed to take an amount of time that is not negligible.

One embodiment detects that the primary node is failing and initiates the priming action upon detecting a heartbeat timeout, to wit, a missing heartbeat from the primary node. Another embodiment detects that the primary node is failing and initiates the priming of one or more takeover nodes when a monitoring node informs the cluster that the primary node is only partially responsive and may not be communicating with other clustered nodes.

When one or more of the nodes have completed the priming action, an embodiment notifies the monitoring node via a cluster-wide command. In response to the command, the monitoring node takes the failing node down, either by halting the node or by removing the failing node's ability to act on data, e.g., by severing the failing node's Input/Output. In one embodiment, a hard timeout, e.g., a deadman switch, is configured to operate at a more-than-presently-used length of time. Should the taking down of the failing node by other means be ineffective, the hard timeout remains in force as a safety mechanism and halts the failing node irrespective of the state of nodes being primed, as in the prior-art.

The enhanced cluster infrastructure of the illustrative embodiments is also effective to shorten the takeover time in a cluster. Essentially, in a cluster for resource management, the enhanced cluster infrastructure of an embodiment can improve takeover performance for any sequence of recovery actions that can be reordered to perform those actions first that can be done safely while another node still might be operating the resources that are to be taken over.

For example, in order to be ready for service, an application might spend significant time initializing, loading static data and establishing client connections. An embodiment allows a priming process to perform these actions in a takeover scenario first. The embodiment defers until later, such as until the elapse of a waiting period, to perform any takeover actions that would disrupt the (possibly) still operational application on the failing node. The embodiment initiates the disruptive actions after the monitoring node has halted the failing node or the failing node halted itself after expiration of the hard time-out deadman switch.

The enhanced cluster infrastructure of the illustrative embodiments enables a phase for those actions in the resource recovery process that are safe to be performed concurrently with a possibly still active instance of resources in the failing node. Cluster recovery actions that utilize this infrastructure of an embodiment thus include a safe concurrent phase. The safe concurrent phase, where the failing node continues to serve the application and the takeover node begins priming concurrently with the failing node's operations, mitigates the cost of a falsely detected failure and thus allows for tighter tuning of the failure detection rate to achieve better failover times in clustered data processing environments.

The illustrative embodiments are described with respect to certain false failures only as examples. Such example failures are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
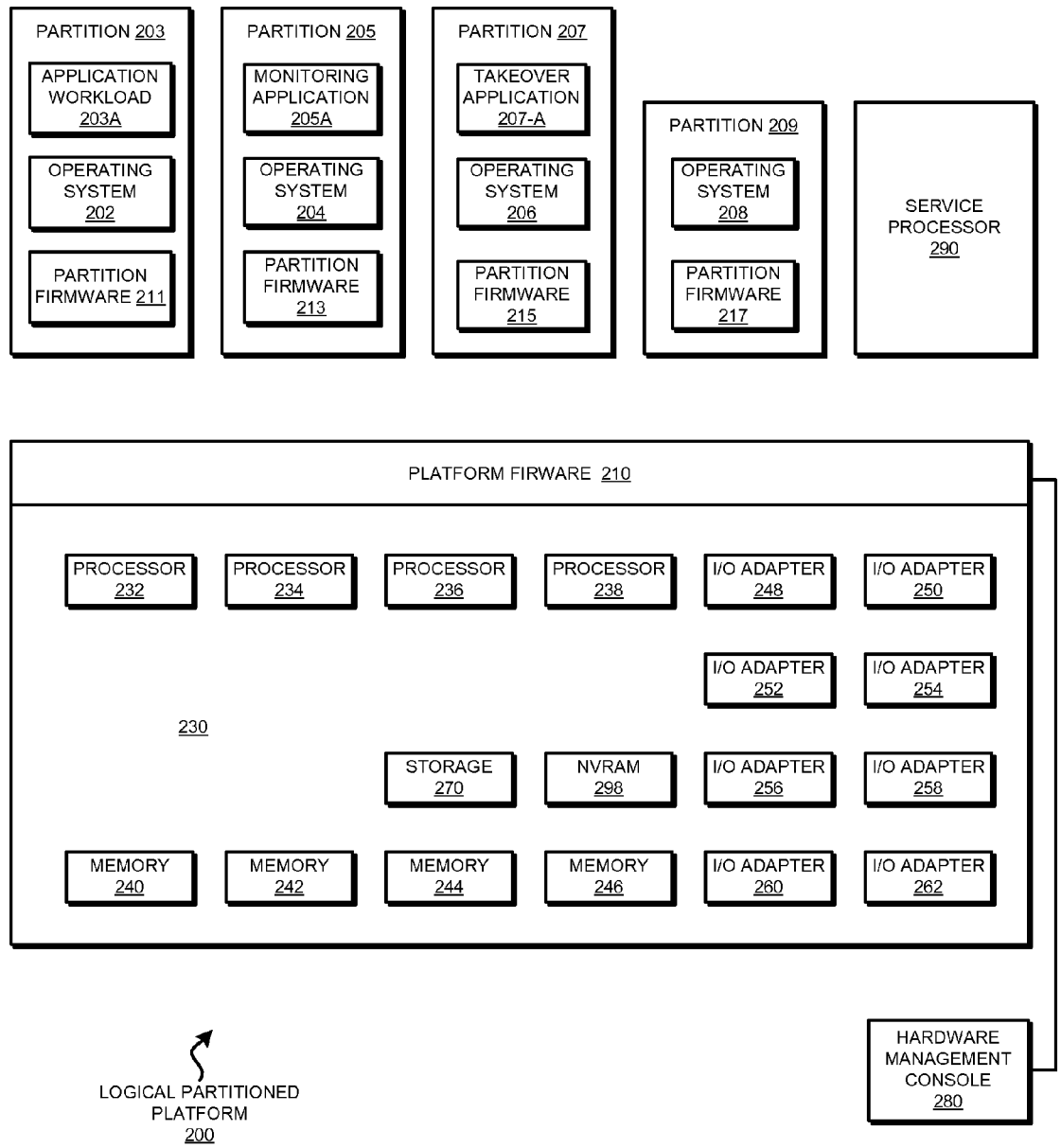
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. As another example, some physical resources, such as adapters, can be virtualized into corresponding virtual resources (not shown), and the virtual resources can then be allocated to the various partitions. As another example, the hardware depicted in FIG. 1 can be configured to use one or more virtual I/O server (VIOS) (not shown). The VIOS allows the sharing of physical resources, such as adapters, disks, controllers, processors, memories, and the like, between the supported logical partitions. Among other functions, between partitions, a shared VIOS helps reduce the need for large amounts of cabling, and perform live migration. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is software stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation.

When partitions 203, 205, 207, and 209 are instantiated, platform firmware 210 loads a copy of boot strap code onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

Partition 203 includes application 203-A. Partition 203 executes a workload for serving application 203-A. Partition 205 includes monitoring application 205-A. Monitoring application 205-A, also referred to as a monitor application, includes an embodiment described herein for monitoring the state of partition 203, communicating such state to a cluster in which partitions 203 and 205 participate, and take actions relative to partition 203 in response to the monitoring or upon instructions from another member of the cluster, such as partition 207. For example, in one embodiment partition 203 operates as a primary node, experiences a condition that causes partition 207 to falsely detect a failure in partition 203. In the embodiment, partition 205 is a monitoring partition associated with partition 203, monitors the responsiveness of partition 203, and communicates to partition 207. Takeover application 207-A in partition 207 begins concurrent priming for taking over the responsibilities of serving application 203-A from partition 203. Takeover application 207-A in partition 207 informs the cluster infrastructure, including partition 205, of the concurrent state of partitions 203 and 205. Takeover application 207-A in partition 207 instructs partition 205 to halt or modify partition 203's operations, and partition 205 performs corresponding operations according to an embodiment described herein. A cluster is not limited to partitions on a single frame, and the depictions of FIG. 2 are only a non-limiting example of a portion of a typical cluster. A cluster can, and typically does, include other partition nodes on other frames. Node 207 is depicted as a takeover node for node 203 on the same frame only as a non-limiting example. A takeover node can reside on a different frame from the primary node within the scope of the illustrative embodiments.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208. CPUs, memory or NVRAM also may be shared between partitions that use or access them sequentially. I/O adapters 248-262 may be assigned to a virtual I/O server to enable sharing of I/O bandwidth between partitions.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing at least some of the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 2A:
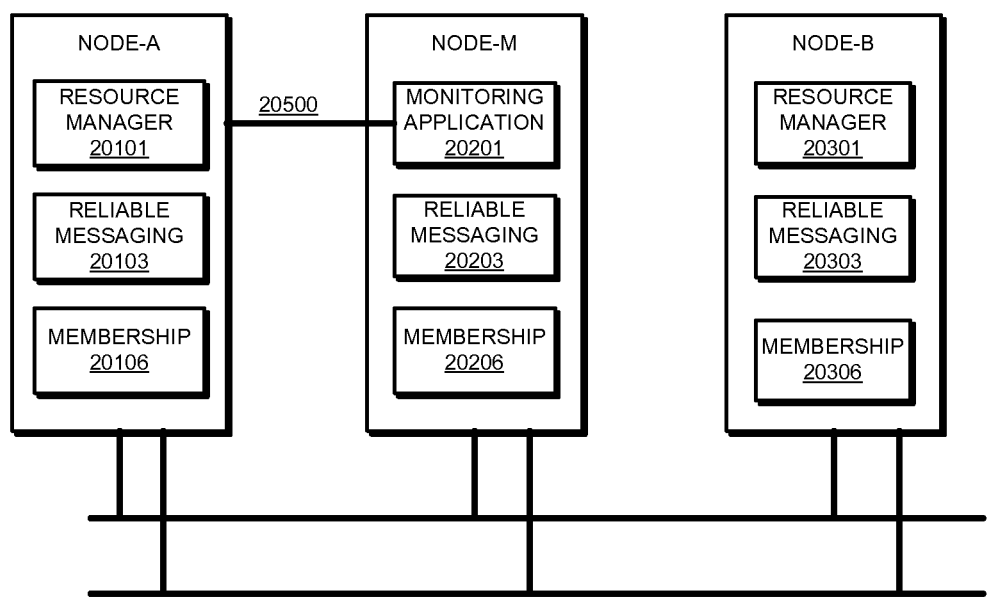
FIG. 2A depicts a general clustering infrastructure in accordance with an illustrative embodiment.

With reference to FIG. 2A, this figure depicts a general clustering infrastructure in accordance with an illustrative embodiment. NODE-A is an example implementation of partition 203 in FIG. 2, NODE-M is an example implementation of partition 205 in FIG. 2, and NODE-B is an example implementation of partition 207 in FIG. 2. NODE-A includes resource manager component 20101, reliable messaging component 20103, and membership component 20106. NODE-M includes monitoring application component 20201, reliable messaging component 20203, and membership component 20306. NODE-B includes resource manager component 20301, reliable messaging component 20303, and membership component 20306.

The membership component in a cluster node, such as components 20106, 20306, and 20506 in NODE-A, NODE-M, and NODE-B, respectively, determines the state of the cluster node be means of exchanging heartbeats with other cluster nodes. A cluster node is in state UP if at least one node is known to receive heartbeats from it and in state DOWN otherwise. NODE-M is a monitoring node that has reliable and trusted connection 20500 to NODE-A, using which NODE-M can query the state of NODE-A. NODE-M's reliable messaging component 20203, and membership component, 20206, may implement a minimal subset of cluster services compared to the cluster services of corresponding components 20103 and 20106 of NODE-A or NODE-B, respectively. The minimal set of cluster services in component 20206 is sufficient to achieve the functional requirements of the cluster domain. For example, reliable messaging component 20203 of NODE-M may not need to take part in barrier synchronization implemented by reliable messaging component 20103 or 20303. NODE-M may also not keep track of the state of all cluster nodes and only communicate with a subset of nodes in a reliable manner upon request. NODE-M might also not sent and receive heartbeats from NODE-A but upon instruction by NODE-B query the state of NODE-A or perform an action, such as halting NODE-A.

An embodiment categorizes the nodes in a cluster by their likelihood to be affected by a condition that can give rise to a false failure, for example, a thread scheduling aberration. Under a thread scheduling aberration one or more threads are not scheduled for a period of time that affects the function of the operating system or other components in the node.

The illustrative embodiments recognize that a thread scheduling aberration is more likely to occur on operating systems that need to page, perform a large amount of inter-processor synchronization, exhibit lock contention, use Active Memory Sharing, and so on. Active Memory Sharing is an IBM PowerVM advanced memory virtualization technology that allows multiple partitions to share a common pool of memory. (Active Memory and PowerVM are trademarks owned by International Business Machines in the United States and in other countries). A sequence of a combination of these or other events is more likely to result in a state where heartbeat threads are not scheduled within the grace period.

Applications with many threads, complex thread synchronization, varying user workload and changes between states, such as query processing, backup, garbage collection, etc. are more likely to extensively use the operating system infrastructure for process synchronization, and memory management. Thus, the illustrative embodiments recognize that a cluster node hosting an application is more likely to exhibit a thread scheduling aberration than a cluster node that is not, and one that has a more homogeneous workload, such as a virtual I/O server (VIOS).

Only for the simplification of the description of the embodiments and without implying any limitation thereto, an embodiment assumes two classes of nodes, the nodes having a threshold or higher likelihood to be affected by a thread scheduling aberration or other false failure causing condition, and the nodes having a lower than a threshold likelihood to be affected by a thread scheduling aberration or other false failure causing condition. A cluster infrastructure typically provides a deadman switch. If a cluster node has not been able to send heartbeats for a configured heartbeat grace period, for instance due to a thread scheduling aberration, the deadman switch will perform a specified action. Typically the deadman switch will halt a node after that node has not been able to send heartbeats for the configured grace period. In a cluster that manages resources, a cluster node may take over the workload of a node from which heartbeats have not been received for the configured grace period. The node from which heartbeats have not been received though may still be operational and its workload accessing storage by the time another node takes over the workload. By halting a node if it has not been able to send heartbeats for the heartbeat grace period, uncoordinated access of workload data is prevented in the case another node acquires the workload in response to not receiving heartbeats. The illustrative embodiments recognize that system-hangs and deadman switch expirations occur predominantly on nodes that carry a complex workload, such as a database. This class of nodes is herein referred to as workload nodes or monitored nodes. Occurrences of system-hangs or deadman switch expirations are seen significantly less in nodes that carry a uniform workload, or a workload of a uniform type. This example class of nodes is herein referred to as monitor nodes or monitoring nodes.

Without implying a limitation thereto, a specialized partition on the same frame that manages virtual resources, such as a VIOS, is an example of a node that would normally qualify as a monitor node. An example candidate for operating as a monitor node is an adjacent, trusted partition on the same frame, designated to act in a monitor node capacity. Another example candidate for a monitoring node is a local or remote entity or component in the cluster that is trusted to manage hardware resources in the cluster. The hypervisor that manages partitions on the same platform is also a candidate for a monitoring node. A workload node is also a candidate monitoring node if the candidate workload node is close to the workload node to be monitored.

A monitor node according to an embodiment has a reliable communication channel with a monitored workload node. The monitor node performs a set of actions to query or affect the state of the monitored workload node. A reliable communication channel is usually a redundant dedicated messaging channel between the nodes in a cluster, between a node and the cluster infrastructure in a cluster, or a combination thereof. Reliable communication is a communication that occurs over a reliable communication channel. An example of a reliable communication channel between a workload node and a monitor node is a protocol provided by the platform firmware.

The monitor node is configured to reliably communicate with the workload node, query the workload node's state and halt or otherwise manipulate that workload node when instructed by the cluster domain. A monitor node according to an embodiment further includes a function to inform other cluster nodes about the state of the associated workload node. A monitor node is able to detect the following states of the cluster nodes the monitor node monitors: SYS_UP—the operating system on the workload node is active, excluding being in an initialization state during boot or being halted, SYS_DOWN—the workload node is not in state SYS_UP and might be inactive, halted, or crashed, as detected by means of platform infrastructure. The monitor node can also detect additional states that the workload node externalizes to the platform infrastructure, including several states during system boot, dump, and being halted. The monitor node's reliable messaging and membership components may implement the full set of functions provided by these components in workload nodes, and thus be able to distinguish whether a workload node is merely in the SYS_UP state, or is in state SYS_UP and able to send heartbeats.

State DOMAIN_RESPONSE_DOWN denotes the state of a node that is in state SYS_UP and has not sent heartbeats for the grace period. If the monitoring node has knowledge of the state of NODE-A derived from heartbeating, the monitoring node can determine whether NODE-A is in state DOMAIN_RESPONSE_DOWN. Otherwise, the state DOMAIN_RESPONSE_DOWN will be arrived at in a process of distributed decision making (voting) by combining the state information provided by the monitoring node (NODE-M) with the ones known by NODE-B and possibly more nodes.

In more detail, assume NODE-M itself has no knowledge if NODE-A is in state UP, but informs NODE-B that NODE-A is in state SYS_UP. NODE-B and possibly further cluster nodes may know the state of NODE-A to be DOWN, since no heartbeats are received. With information from monitoring node NODE-M that NODE-A is in state SYS_UP, NODE-B and further nodes will change the state of NODE-A from DOWN to DOMAIN_RESPONSE_DOWN by distributed decision making. Some cluster states are mutually exclusive, such as UP and DOWN, or SYS_UP and SYS_DOWN. Further states might be defined by logical AND combination. For instance, a node is in state DOMAIN_RESPONSE_DOWN if it is in state DOWN and SYS_UP. Depending on further states the monitoring node is able to detect, the set of states maintained by the cluster might include further states. If the monitor node can detect whether or not a workload node is performing I/O it can discern state ALL_RESPONSE_DOWN—the workload node in state SYS_UP yet is not performing I/O, the workload node is likely in a hung state. If the monitoring node can detect the state that a node is booting, for instance by querying codes emitted by that node during boot or dump, additional states maintained by the cluster layer might be BOOT or DUMP.

The features described for a monitor node can be implemented in a monitoring application, such as monitoring application 205A in FIG. 2, executing in a node in a cluster. The features described for a takeover node can be implemented in a takeover application, such as takeover application 207A in FIG. 2, executing in a node in a cluster. A monitor node can monitor any number of workload nodes. Any number of nodes on a frame can be operable as monitor nodes, become monitor nodes if another monitor node fails, takeover another monitor node's responsibilities, or a combination thereof. For example, in one embodiment, the primary VIOS in a given configuration acts as a monitor node for a given workload node. If the primary VIOS fails, the secondary VIOS takes over the monitoring functionality for that workload node.

With reference to FIG. 3, this figure depicts a timing diagram of a clustered database environment that can be modified by using an illustrative embodiment. Primary node 302, labeled "NODE-A" is an embodiment of a workload node and can be implemented using partition 203 in FIG. 2. Cluster infrastructure 304 is the hardware and software infrastructure for managing the operation of the cluster in which NODE-A participates. In one embodiment, cluster infrastructure 304 includes a monitor node (collectively referred to as monitoring facility 304), which can be an embodiment of partition 205 in FIG. 2. Node 306, labeled "NODE-B" is an embodiment of partition 207 in FIG. 2 and operates as a takeover node for NODE-A.

The ordering and spacing between events in timing diagram 300 are approximate, exaggerated, or selected for the clarity of the description without implying a limitation thereto. Timing diagram 300 assumes that node 302 is not halted and is operational at the beginning of the depicted process.

Using the cluster infrastructure, the active nodes in the cluster collaborate to compute and revise waiting periods for the various nodes, should one of the nodes go down (operation 310). The process of an embodiment begins when node 306 detects a failure in node 302 (operation 312). For example, NODE-B may not receive a heartbeat from NODE-A within a heartbeat grace period. Monitoring facility 304, over a reliable communication channel with node 302, detects whether some activity, such as ongoing I/O, is continuing at node 302 (operation 314).

Depending on whether some activity is ongoing at node 302, monitoring facility 304 informs node 306 that node 302 is in either DOMAIN_RESPONSE_DOWN status or ALL_RESPONSE_DOWN status (operation 316). Monitoring facility 304 sets a waiting period, also referred to as a resource grace period, for node 302 (operation 318). For example, in one embodiment, all active nodes in the cluster, including monitoring facility 304 collaboratively determine the waiting period. The waiting period for node 302 starts with the expiration of the heartbeat timeout grace period, enabled by the cluster infrastructure.

Generally, an embodiment uses three grace periods in addition to the heartbeat timeout grace period already existing in the cluster implementations. A resource grace period, or waiting period, is an additional grace period starting after termination of the heartbeat timeout grace period. In one embodiment, the start and expiration of the resource grace period is communicated to all cluster nodes by means of a barrier synchronization protocol and used to coordinate safe concurrent actions. During the duration of the resource grace period, NODE-B performs safe concurrent priming actions. During that grace period, NODE-B does not proceed beyond the safe concurrent priming actions. Node-A is halted after expiration of the resource grace period by means of a deadman switch, if NODE-A has not resumed heartbeating and rejoined the cluster domain. Thus, the deadman switch timeout for workload node NODE-A is the sum of the values for the heartbeat timeout grace period and the resource grace period. A revised value for the resource grace period, to enable a time window for safe concurrent actions during recovery from a failure of NODE-A is determined periodically and communicated to all cluster nodes. In case of a failure of NODE-A, all cluster nodes use the last successfully communicated value for the resource grace period. NODE-A will consider this value to update its value for the deadman switch timeout. In one embodiment, NODE-B sets the resource grace period by approximating the time NODE-B expects to take to complete the priming actions.

In one embodiment, the values of the network and responsiveness grace periods end after the resource grace period has ended and are usable as lower bounds for the deadman switch timeout. A network grace period models how long heartbeats may not be received from a node taking into account information about the network hardware. In one embodiment, the network grace period can be approximated to the reboot or initialization time of a network device, such as the time for cycling a switch or a router. NODE-B will tolerate a failure to receive heartbeats from a node, NODE-A for the heartbeat timeout, before declaring NODE-A as DOWN when no monitor node associated with NODE-A exists that determines that NODE-A is performing some activity to otherwise set the state of NODE-A to DOMAIN_RESPONSE_DOWN. In one embodiment, the network grace period models an extension of the timeout for which the cluster infrastructure will wait at minimum beyond the point when the state of NODE_A had been set to DOWN before progressing past the safe concurrent phase. In other words, the network grace period is used as a lower bound for setting the deadman switch timeout.

A responsiveness grace period set for a node models how long heartbeats may not be received from a node taking into account the likelihood of that node experiencing a thread scheduling aberrations. In one embodiment, the responsiveness grace period is an approximation of the time NODE-A can be expected to take to recover from an event that causes heartbeat threads not to be scheduled. The responsiveness grace period has at least the duration of the heartbeat timeout and is a lower bound for setting the deadman switch timeout.

Returning to timing diagram 300, node 306 sets waiting period 320 in operation 318 for node 302. Node 306 informs cluster infrastructure 304 that node 306 is operating in safe concurrency with node 302 (operation 322). Node 306 primes for the takeover of node 302 and operates concurrently with node 302 (operation 324). Certain alternative operations can occur according to various embodiments before and after waiting period 320 expires (operation block 326).

With reference to FIG. 4, this figure depicts a timing diagram of operations within the resource grace period in accordance with an illustrative embodiment. Timing diagram 400 is one alternative continuation from timing diagram 300 in FIG. 3 using the same entities 302, 304, and 306 as located and described in FIG. 3.

Waiting period 320 continues as shown in timing diagram 400. Node 306 completes the priming and is ready for taking over node 302's responsibilities (operation 412). Monitoring facility 304 detects whether node 302 is performing any activity (operation 414). Subject to some activity at node 302, such as ongoing I/O, monitoring facility 304 reports to the cluster, including node 304, that node 302 is in either DOMAIN_RESPONSE_DOWN status or ALL_RESPONSE_DOWN status (operation 416).

According to the embodiment depicted in FIG. 4, node 306 instructs monitoring facility 304 to halt node 302 (operation 418). Monitoring facility 304 can either halt node 302 or suspend node 302's I/O operations such that the resource group allocated to node 302 can be reassigned to node 306 (operation 420). Consequently, node 302 either halts or loses I/O access to node 302's resources (operation 422).

Node 306 terminates the concurrency and completes the takeover (operation 424). Node 306 begins operating to serve the application that node 302 was serving (operation 426).

Note that waiting period 320 is depicted to end as shown only as an example. For example, waiting period 320 could have ended prior to operation 412 if the cluster infrastructure underestimated the time to complete the priming actions. Or, waiting period 320 could have ended any time after operation 412 when node 306 is primed and ready to takeover node 302.

With reference to FIG. 5, this figure depicts a timing diagram of operations within the resource grace period in accordance with an illustrative embodiment. Timing diagram 500 is another alternative continuation from timing diagram 300 in FIG. 3 using the same entities 302, 304, and 306 as located and described in FIG. 3.

Waiting period 320 continues as shown in timing diagram 500. Node 306 completes the priming and is ready for taking over node 302's responsibilities (operation 512). Cluster infrastructure 304 detects whether node 302 is active, such as transmitting heartbeats (operation 514).

Suppose that node 302 has recovered within waiting time 320 as speculated by an embodiment. Cluster infrastructure 304 reports to the cluster, including node 306, that node 302 is in UP status (operation 516).

According to the embodiment depicted in FIG. 5, node 306 ends the safe concurrency and discards the primed data for the takeover, allowing node 302 to continue in the primary node role (operation 518). In another embodiment (not shown), node 306 could continue the takeover even when node 302 returns to the UP status if the cluster infrastructure determines that node 306 were a better choice to serve as the primary node, for example, when node 302's performance is below a threshold level of performance and node 306's performance is at or above the threshold.

With reference to FIG. 6, this figure depicts a timing diagram of operations within the resource grace period in accordance with an illustrative embodiment. Timing diagram 600 is another alternative continuation from timing diagram 300 in FIG. 3 using the same entities 302, 304, and 306 as located and described in FIG. 3.

Waiting period 320 continues as shown in timing diagram 600. Suppose that node 302 has recovered within waiting time 320 as speculated by an embodiment. Node 306 is working to complete the priming when node 306 detects, such as through heartbeats in the cluster, that node 302 is in UP status (operation 614).

Node 306 ends the concurrency (operation 616), informs the cluster infrastructure that the concurrency with node 302 has ended (operation 618), and abandons the priming process (operation 620). Waiting period 320 can elapse not only as shown but any time after operation 614 in FIG. 6. As in FIG. 5, in another embodiment (not shown), node 306 could continue the takeover even when node 302 returns to the UP status if the cluster infrastructure determines that node 306 were a better choice to serve as the primary node, for example, when node 302's performance is below a threshold level of performance and node 306's performance is at or above the threshold.

With reference to FIG. 7, this figure depicts a timing diagram of operations within the resource grace period in accordance with an illustrative embodiment. Timing diagram 700 is another alternative continuation from timing diagram 300 in FIG. 3 using the same entities 302, 304, and 306 as located and described in FIG. 3.

Waiting period 320 continues as shown in timing diagram 700. Suppose that node 302 has not recovered within waiting time 320 as speculated by an embodiment and waiting time 320 elapses as shown and the deadman switch timeout period expires, halting NODE-A (714). Cluster infrastructure reports NODE-A is in state HALT (716). NODE-B completes priming (718) some time after being informed of state HALT for NODE-A. After completion of priming NODE_B can immediately proceed with further takeover steps since NODE-A is halted at that point.

Figure 8:
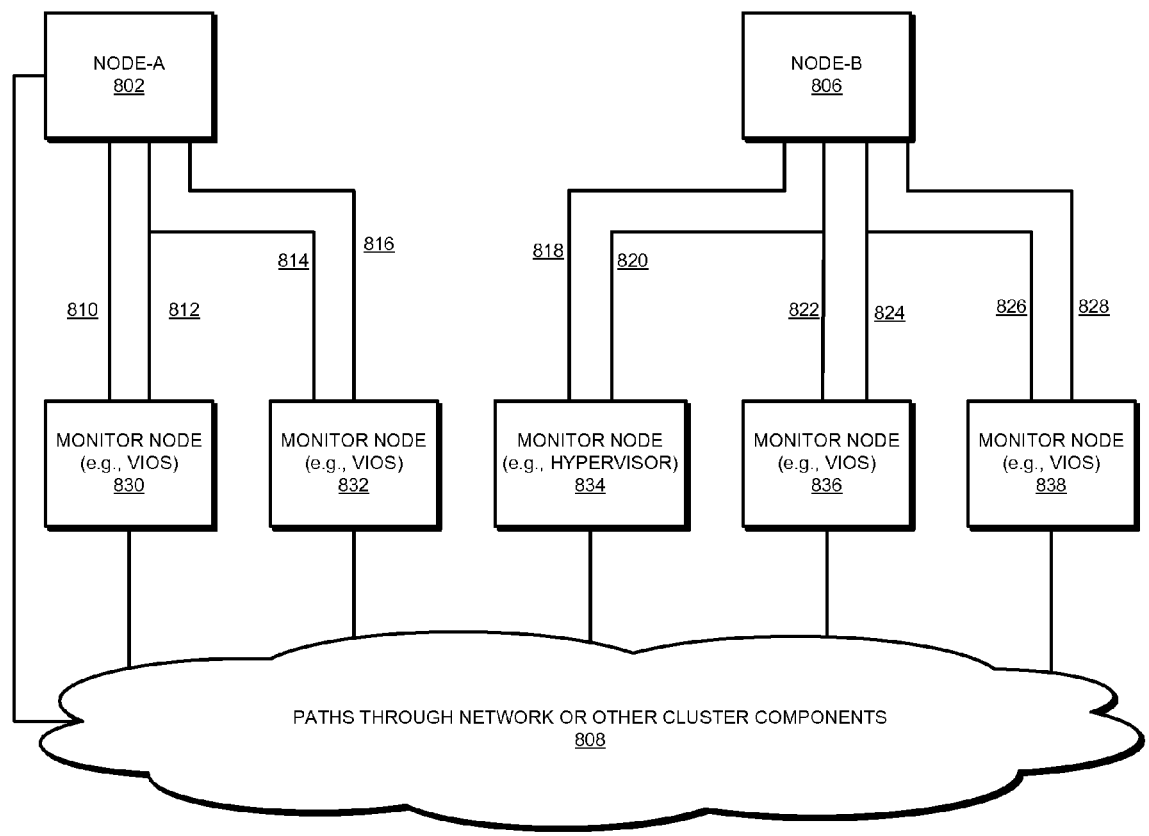
FIG. 8 depicts a block diagram of an example configuration of workload nodes and monitor nodes for tolerating failures using concurrency in a cluster in accordance with an illustrative embodiment.

With reference to FIG. 8, this figure depicts a block diagram of an example configuration of workload nodes and monitor nodes for tolerating failures using concurrency in a cluster in accordance with an illustrative embodiment. Node 802 is an example of node 302 in FIG. 3, and is correspondingly labeled "NODE-A". Node 806 is an example of node 306 in FIG. 3, and is correspondingly labeled "NODE-B". Any number of paths through one or more networks available to clustered nodes 802 and 806, any number of paths through components used in the cluster, such as through storage devices, or any combination thereof, forms cloud 808.

Example communication channels 810, 812, 814, 816, 818, 820, 822, 824, 826, 828, and other such communication channels, allow reliable communications between node 802, node 806, monitor node 830, monitor node 832, monitor node 834, monitor node 836, and monitor node 838. For example, communication channels 810 and 812 form reliable communication channel between node 802 and monitor node 830. Similarly, communication channels 814 and 816 form a redundant reliable communication channel between node 802 and monitor node 832, where monitor nodes 830 and 832 are themselves in a redundant or takeover configuration with each other. Other communication channels and monitor nodes are similarly connected with node 806.

Generally, the term "reliable" in the context of the connections between workload and monitoring nodes in the disclosure is used to describe a connection by an integrated physical medium or an integral part of the hardware's architecture that is assumed not to fail. For example, the firmware operating on the bus system connecting the components, such as any of system bus 106, I/O bus 112, PCI bus 195, ISA bus 196, and the like in FIG. 1, can be regarded as a reliable communication channel because that bus is not supposed to fail. If the firmware or bus hardware fails, there is no guarantee of system survival anyway. The operating system executing on a layer above the firmware as a component of the software stack does not try to second guess states, services and information provided by the firmware. The firmware has reliability functions built in. For example, the firmware may account for the possibility of the failure of a bus and re-route its protocols through a second bus.

To enable a reliable connection between the monitoring node and workload node an embodiment adds appropriate functions to firmware, either by utilizing already existing infrastructure, or by designing a function following the established paradigms for reliability in firmware programming. Thus, communication channels 810 and 812, and other such depicted channels in FIG. 8, form reliable communication channel not only due to redundancy but also for providing different paths through the infrastructure in the described-above example manner. Without being limited to two example channels as shown, any number and types of channels can similarly be configured to operate as a reliable communication channel within the scope of the illustrative embodiments.

Only as an example, monitor nodes 830, 832, 836, and 838 are depicted as VIOS. As another example, monitor node 834 is depicted as a hypervisor configured with aspects of an embodiment, such as with some or all the features of monitoring application 205-A in FIG. 2, to operate as a monitor node.

Similar to using a partition that manages I/O resources as a monitoring node for severing a failing node's access to data, a hypervisor that hosts nodes within the cluster domain can be extended such that it can bring down a failing node if needed. Implementations could include the hypervisor actively participating as a monitor node within the cluster domain, or the hypervisor supporting a 'kill node' interface through a trusted, well-defined API. Thus, in the role of a monitor node, an embodiment tasks the hypervisor to support the forced removal of a node from the cluster's operating domain.

The reliable communication channels depicted in FIG. 8 are not exhaustive. Nodes 802 and 806 perform essential cluster functions, such as the heartbeat messaging, with each other, various monitor nodes, and other nodes in the cluster using similar reliable communication channels (not shown). Each monitor node performs at least a minimal subset of cluster services compared to the cluster services in nodes 802 or 806 respectively. The minimal set of cluster services in a monitoring node is sufficient to achieve the functional requirements of the cluster domain.

A monitor node, such as monitor node 830, has the ability to halt a workload node, such as node 802, on the same frame. If the monitor node is a VIOS, as is example monitor node 830, the monitor node can suspend the I/O activity of the associated workload node. According to an embodiment, a monitor node may be instructed to perform any of the several cluster actions upon instruction by the active cluster domain by means of a cluster wide protocol. The illustrative embodiments provide several new instructions not presently available in clusters, which can be used in combination with existing instructions.

For example, node 806 can instruct monitor node 830 to halt node 802 via a NODE_HALT instruction. Node 806 can instruct monitor node 830 to suspend I/O on node 802 via a NODE_IO_SUSPEND instruction if monitor node 830 is a VIOS. Conversely, node 806 can also instruct monitor node 830 to resume I/O on node 802 via a NODE_IO_RESUME instruction if monitor node 830 is a VIOS. These example instructions are provided only for the clarity of the description and not as a limitation on the illustrative embodiments. Thus, by using a platform component or VIOS for monitoring, halting a node, or suspending and resuming I/O at a node, an embodiment implements a wider choice of actions in response to node function degradations or failures that occur frequently in complex clustered data processing environments.

Figure 9:
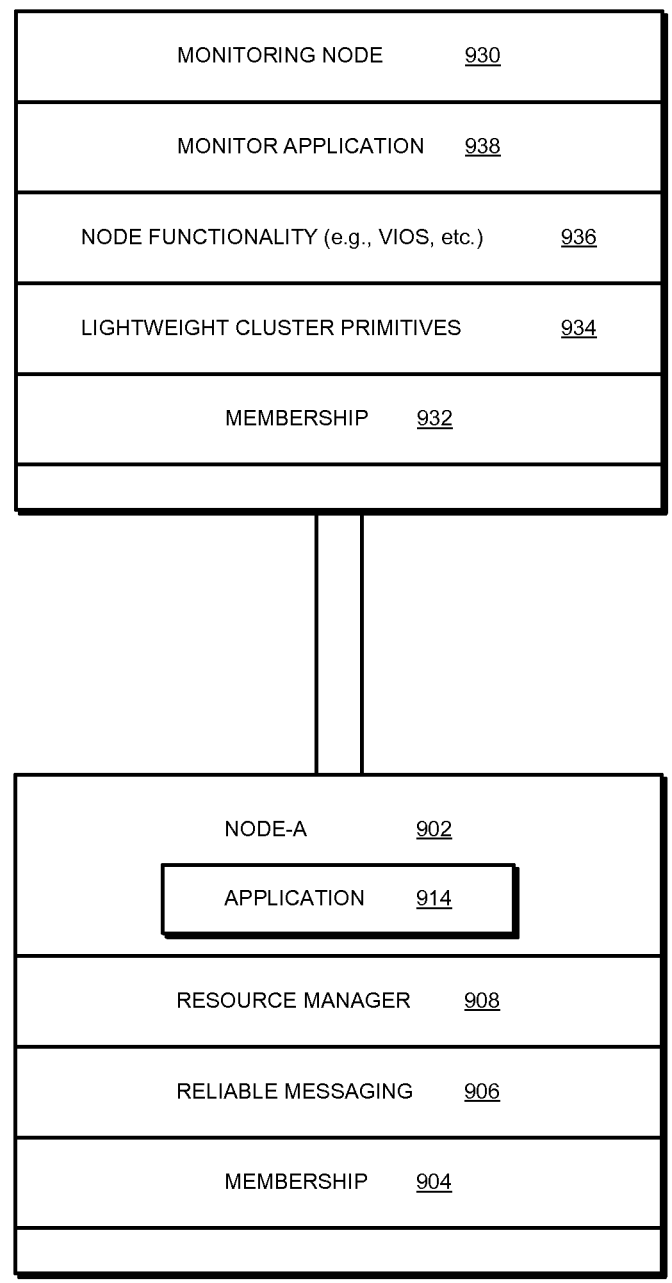
FIG. 9 depicts an example configuration for tolerating failures using concurrency in a cluster in accordance with an illustrative embodiment.

With reference to FIG. 9, this figure depicts an example configuration for tolerating failures using concurrency in a cluster in accordance with an illustrative embodiment. Node 902 can be implemented as node 802 in FIG. 8 and is correspondingly labeled "NODE-A". Monitor node 930 can be implemented as monitor node 830 in FIG. 8.

As an example, node 902, as a workload node in the cluster, is configured with membership component 904, reliable messaging component 906, and resource manager 908. Membership component 904 maintains the state of the various nodes in the cluster by sending heartbeats between cluster members, across multiple redundant network connections. Reliable messaging component 906 provided essential functions for distributed systems, such as reliable messaging and barrier synchronization in the cluster. Resource manager 908, using the services of the lower layers, implements distributed resource management in node 902.

Monitor node 930, however, can be configured in a much more lightweight manner according to an embodiment. For example, monitor node 930 implements membership component 932 to participate in the cluster. However, monitor node 930 implements only some cluster primitives 934 instead of the full reliable messaging stack as in node 902. A resource manager (not shown) may be needed depending on the functionality implemented in monitor node 930. In one example embodiment, monitor node 930 implements node functionality 936 that allows monitor node 930 to operate as a VIOS in the cluster. Monitoring application 938 allows node 930 to also operate as monitor node.

In one embodiment, monitor node 930 is dynamically created on a frame when node 902 hosting an application, such as application 203-A in FIG. 2, exists on the frame. For example, an embodiment creates one or more monitor nodes similar to monitor node 930 on a frame participating in a cluster when a resource group moves to node 902 on that frame. The dynamic creation of monitor nodes is particularly valuable on platforms architectures that do not have a VIOS, or in scenarios where a VIOS is not used for performance reasons. Embedded into the cluster wide protocol to acquire the application on node 902, monitor node or partition 930 may be created in parallel. When monitor node 930 is operational and integrated in the cluster, an embodiment activates the network grace period and the responsiveness grace period for node 902.

In one embodiment, monitoring node 930 may be so primitive as to not have full functionality of the membership layer. Accordingly, monitoring node 930 might not be able to maintain a reliable communication link with more than one node. In this case, it might not be able to discern its own state. In this case, the determination of state of monitoring node 930 would be made by two nodes, monitoring node 930 and another node in the cluster that is able to receive and send heartbeats.

Figure 10:
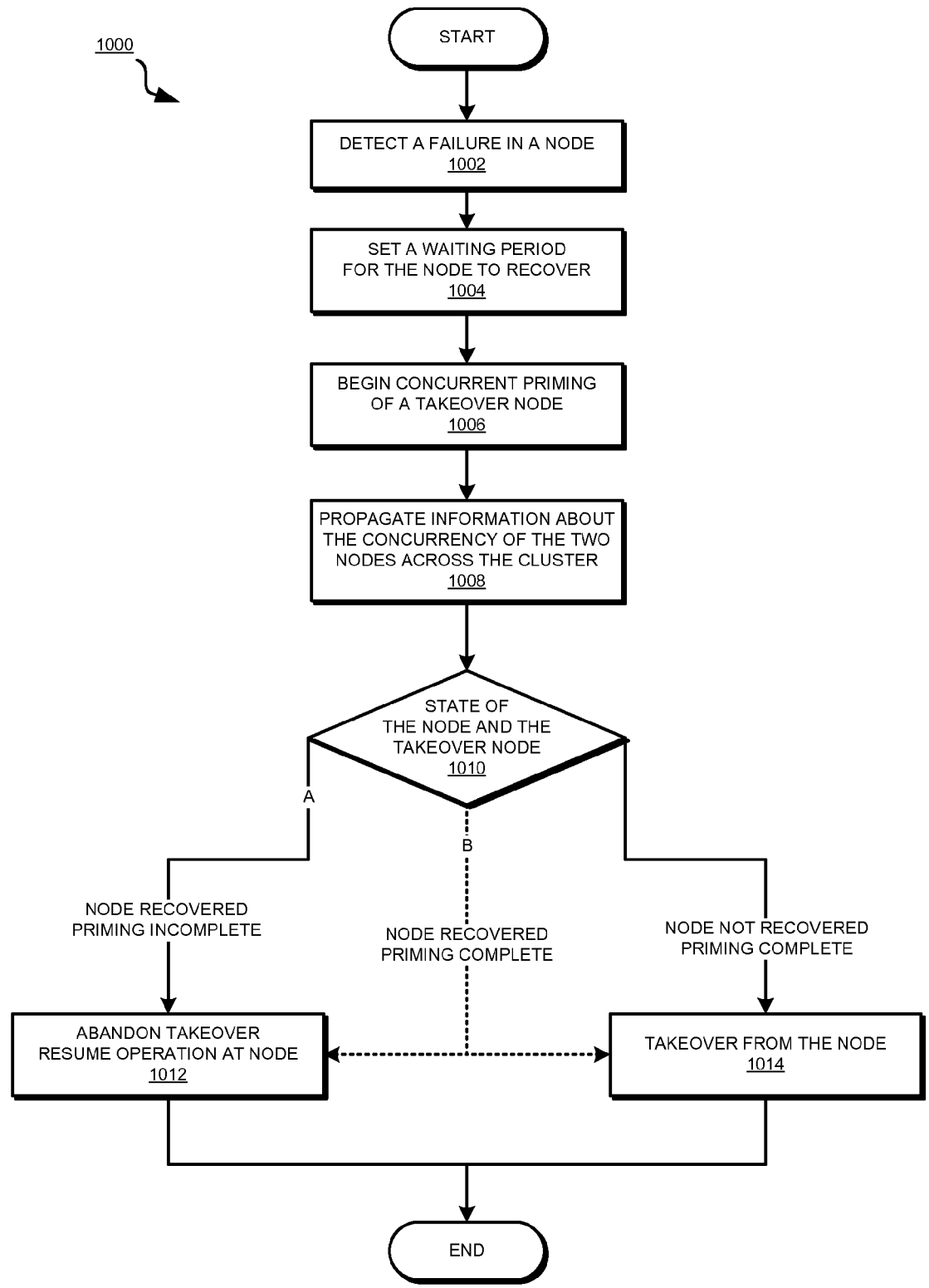
FIG. 10 depicts a flowchart of an example process for tolerating failures using concurrency in a cluster in accordance with an illustrative embodiment.

With reference to FIG. 10, this figure depicts a flowchart of an example process for tolerating failures using concurrency in a cluster in accordance with an illustrative embodiment. Process 1000 can be implemented in a takeover node, such as in the form of takeover application 207-A in FIG. 2.

A takeover application begins by detecting a failure in a workload node, such as in node 902 in FIG. 9 (step 1002). The takeover application sets a waiting period for the failing node, expecting the failing node to recover from the detected failure within the waiting period (step 1004).

The takeover application begins those actions from a takeover operation that can be performed concurrently with the failing node remaining operational, such as by performing concurrent priming actions on the takeover node (step 1006). The takeover application propagates information about the concurrency of the failing node and the takeover node to the cluster (step 1008).

The takeover application considers the state of the failing node and the state of the takeover node (step 1010). In one embodiment, if the failing node has recovered, e.g., if the failing node becomes responsive again, and the priming at the takeover node is yet incomplete ("A" path of step 1010), the takeover application abandons the takeover operation by abandoning the priming operations, and allows the previously-failing node to resume operations (step 1012).

In one embodiment, if the failing node is responsive again and the priming operations at the takeover node have been completed ("B" path of step 1010), the takeover application abandons the priming and allows the previously-failing node to resume operations at step 1012. In another embodiment, if the failing node is responsive again and the priming operations have been completed ("B" path of step 1010), the takeover application proceeds to take over from the previously-failing node (step 1014). In one embodiment, if the failing node is still non-responsive at the time the priming has been completed ("C" path of step 1010), the takeover application proceeds to take over from the failing node at step 1014. The takeover application ends process 1000 thereafter.

Whether to abandon the priming operations on the takeover node or to take over from the failing node is a determination that the takeover application makes by considering a combination of any number of implementation-specific factors, for example, including but not limited to comparative performance of the previously-failing node and the takeover node. Those of ordinary skill in the art will be able to conceive additional factors for determining whether to take over from the previously-failing node or abandon the takeover, and the same are contemplated within the scope of the illustrative embodiments.

Figure 11:
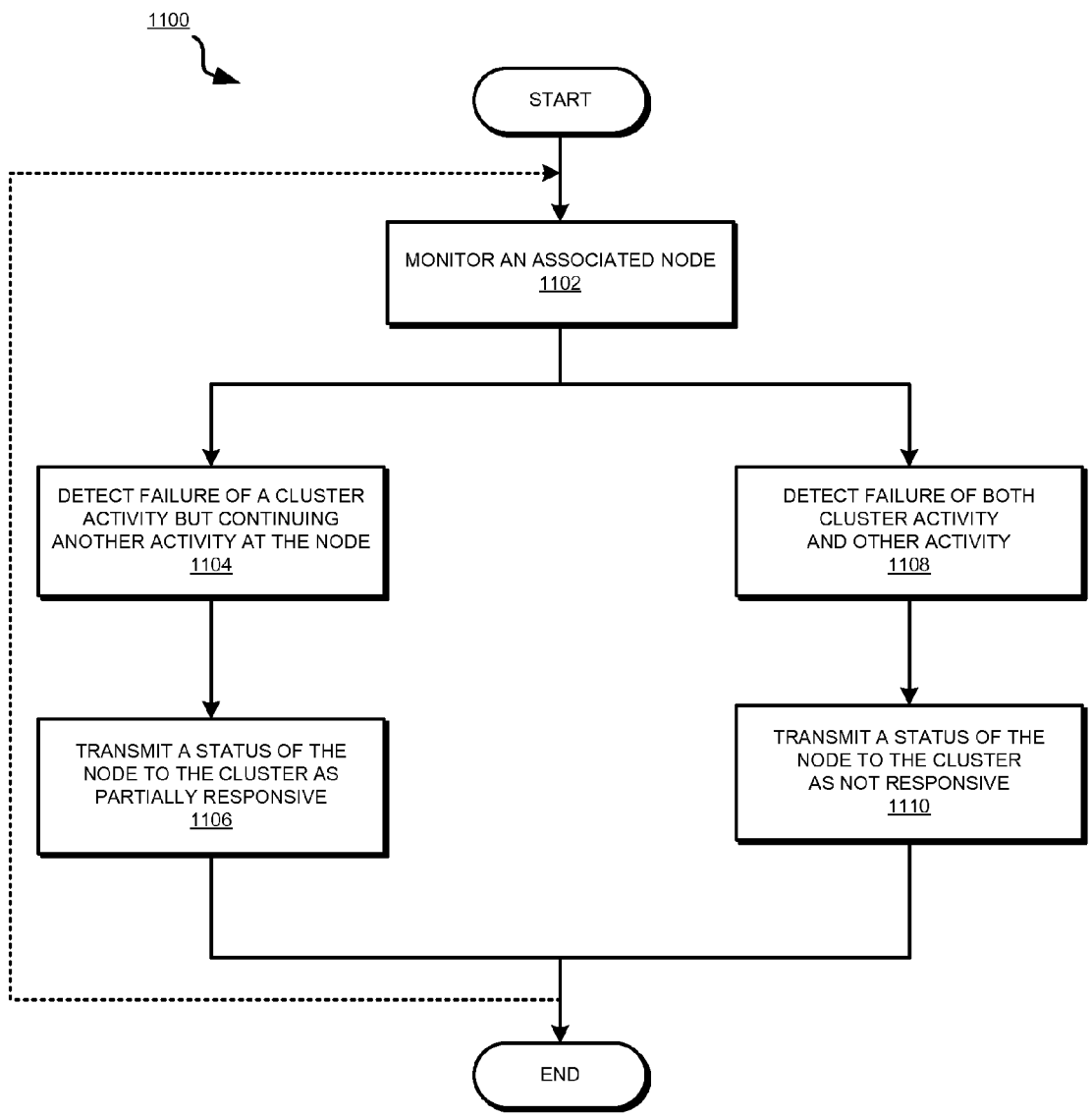
FIG. 11 depicts a flowchart of a monitoring process in accordance with an illustrative embodiment.

With reference to FIG. 11, this figure depicts a flowchart of a monitoring process in accordance with an illustrative embodiment. Process 1100 can be implemented in a monitor application, such as in monitor application 938 in FIG. 9.

A monitor application monitors an associated node, such as node 902 in FIG. 9 (step 1102). The monitor application can detect different conditions at the associated node.

For example, in one embodiment, the monitor application detects that the associated node has a failure in the cluster activity, such as when the node is not transmitting heartbeats, but that the associated node continues to perform other activities, such as I/O, (step 1104). Accordingly, the monitor node transmits a status of the associated node to the cluster indicating that the associated node is partially responsive (step 1106).

In another embodiment, the monitor application detects that the associated node has a failure in the cluster activity and that the associated node is not performing any other activities, such as I/O, either (step 1108). Accordingly, the monitor node transmits a status of the associated node to the cluster indicating that the associated node is non-responsive (step 1110).

If the associated node is performing cluster activities, or cluster activities and other activities, the monitor application transmits to the cluster that the associated node is up (not shown). Similarly, if the monitor application detects that the associated node has been halted or crashed, the monitor application transmits to the cluster that the associated node is down or halted (not shown).

These steps can repeat any number of times without limitation for continued monitoring of the associated node, or the monitor application may end process 1100 thereafter. Also, these steps may be initiated upon request from a cluster node (not shown).

Figure 12:
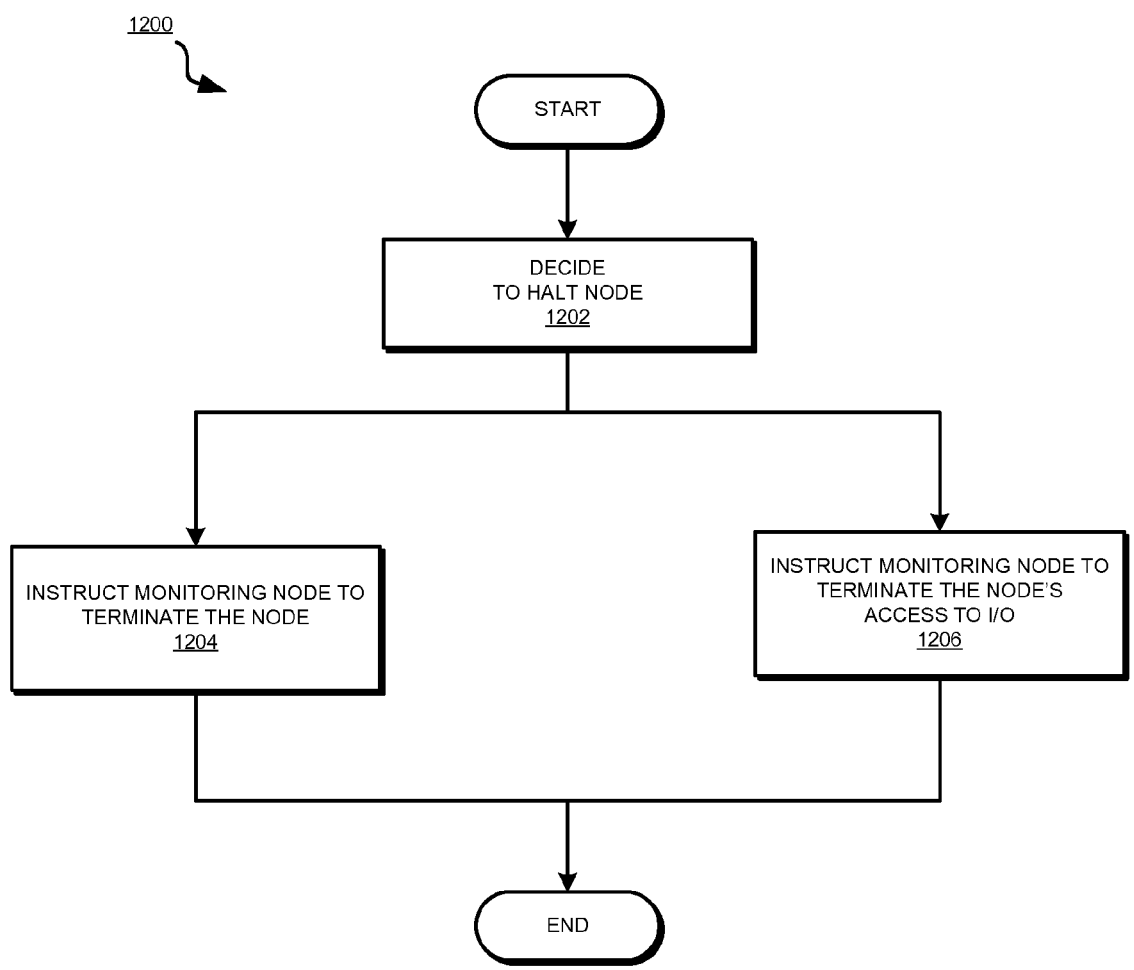
FIG. 12 depicts a flowchart of an example process for terminating concurrency in accordance with an illustrative embodiment.

With reference to FIG. 12, this figure depicts a flowchart of an example process for terminating concurrency in accordance with an illustrative embodiment. Process 1200 can be implemented in a cluster infrastructure, such as in cluster infrastructure 304 in FIG. 3.

A cluster infrastructure decides to halt a node (step 1202). In one embodiment, the cluster infrastructure instructs the monitor application to halt, kill, or otherwise terminate the node (step 1204) and ends process 1200 thereafter. In another embodiment, the cluster infrastructure instructs the monitor application to only terminate the node's access to certain resources, such as by terminating only the node's I/O access to data storage (step 1206), and ends process 1200 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for tolerating failures using concurrency in a cluster. An embodiment allows a failing node a tunable or changeable speculative opportunity to recover from a failure over a period longer than a grace period for the heartbeat messages but before a deadman switch time-out expires. During the speculative opportunity period, in a priming operation, a takeover node performs those actions from the takeover operation that can be performed concurrently with the failing node's continued operation in the cluster. An embodiment allows the failing node to resume normal operations without a takeover if the node recovers from the failure within the speculative opportunity period. An embodiment takes over the failing node's role by proceeding further from the priming, if the failing node fails to recover from the failure within the speculative opportunity period, or recovers without the desired performance level.

In one embodiment, a monitoring node can be created for a workload node based on certain conditions. For example, a new or existing workload node may be configured to exceed a threshold specification, such as to use more than a threshold number of CPUs, memory, or threads. The embodiment determines whether a corresponding monitoring node exists for the new or modified workload node. If none exists, the cluster infrastructure dynamically creates a monitoring node and associates with the new or modified workload node in the manner described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for tolerating failures using concurrency in a clustered data processing environment, the method comprising:
    detecting a failure in a first computing node, the first computing node serving an application in a cluster of computing nodes;
    selecting a subset of actions from a set of actions, the set of actions configured to transfer the serving of the application from the first computing node to a second computing node in the cluster;
    reordering the set of actions such that the subset of actions can be performed before a second subset of actions in the set of actions;
    setting a waiting period for the first computing node;
    allowing the first computing node to continue serving the application in the cluster during the waiting period;
    performing during the waiting period, concurrently with the first computing node serving the application, the subset of actions at the second computing node; and
    aborting, responsive to receiving a signal of activity from the first computing node during the waiting period, the concurrent operation of the second computing node in the cluster.

2. The method of claim 1, wherein the performing the subset of actions comprises: completing a task in preparation for the takeover.

3. The method of claim 1, wherein the performing of the second subset of actions ends concurrent operation of the first computing node and the second computing node.

4. The method of claim 3, wherein the second subset of actions terminates the serving of the application from the first computing node.

5. The method of claim 1, further comprising:
    monitoring the first computing node, wherein the monitoring comprises detecting whether the first computing node is performing a cluster activity and a second activity; and
    communicating to the cluster, responsive to detecting the second activity and not detecting the cluster activity, that the first computing node is partially operational.

6. The method of claim 5, further comprising:
    receiving, during the transfer the serving of the application from the first computing node to the second computing node, an instruction to halt the first computing node; and
    terminating, responsive to the instruction, an input/output operation of the first computing node instead of halting the first computing node.

7. The method of claim 5, further comprising:
setting a responsiveness grace period for the first computing node, wherein the responsiveness grace period is an estimate of time within which the first computing node is expected to recover from the failure.

8. The method of claim 1, further comprising:
monitoring the first computing node, wherein the monitoring comprises detecting whether the first computing node is performing a cluster activity and a second activity; and
communicating to the cluster, responsive to not detecting the second activity and not detecting the cluster activity, that the first computing node is non-responsive.

9. The method of claim 8, further comprising:
setting a network grace period for the first computing node, wherein the network grace period is an estimate of time within which a network component used for communicating with the first computing node is expected to become operational.

10. The method of claim 8, wherein detecting the cluster activity comprises detecting whether the first computing node sending a heartbeat message.

11. The method of claim 8, wherein detecting the second activity comprises: detecting whether the first computing node performs an input/output operation.

* * * * *